(12) United States Patent
Takacs et al.

(10) Patent No.: US 8,924,742 B2
(45) Date of Patent: Dec. 30, 2014

(54) MULTI-LEVEL DATA STORAGE

(75) Inventors: Kristof Takacs, Waterloo (CA); Neil Patrick Adams, Waterloo (CA); Ravi Singh, Mississauga (CA); Van Quy Tu, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1211 days.

(21) Appl. No.: 12/369,350

(22) Filed: Feb. 11, 2009

(65) Prior Publication Data

US 2010/0205425 A1 Aug. 12, 2010

(51) Int. Cl.
| | |
|---|---|
| G06F 11/30 | (2006.01) |
| H04N 7/167 | (2011.01) |
| G06F 21/62 | (2013.01) |
| G06F 21/32 | (2013.01) |
| H04L 29/06 | (2006.01) |
| H04L 29/08 | (2006.01) |

(52) U.S. Cl.
CPC ............ *G06F 21/6209* (2013.01); *G06F 21/32* (2013.01); *H04L 63/08* (2013.01); *H04L 63/105* (2013.01); *H04L 67/04* (2013.01)
USPC .......................................... 713/193; 380/232

(58) Field of Classification Search
CPC .. H04L 63/0492; H04L 9/3231; H04L 9/3243
USPC ........................................................ 713/193
See application file for complete search history.

(56) References Cited

U.S. PATENT DOCUMENTS

| | | | | |
|---|---|---|---|---|
| 5,712,912 | A * | 1/1998 | Tomko et al. .................. | 713/186 |
| 6,718,468 | B1 * | 4/2004 | Challener et al. ............. | 713/184 |
| 7,069,447 | B1 * | 6/2006 | Corder .......................... | 713/189 |
| 7,643,851 | B2 * | 1/2010 | Otsuka et al. ................. | 455/560 |
| 2002/0038370 | A1 * | 3/2002 | Demoto et al. ............... | 709/227 |
| 2002/0188855 | A1 * | 12/2002 | Nakayama et al. ........... | 713/186 |
| 2004/0083380 | A1 * | 4/2004 | Janke ............................ | 713/194 |
| 2004/0172531 | A1 * | 9/2004 | Little et al. .................... | 713/155 |
| 2004/0242029 | A1 | 12/2004 | Nakamura et al. | |
| 2006/0041932 | A1 * | 2/2006 | Cromer et al. ................ | 726/6 |
| 2006/0059375 | A1 | 3/2006 | Ooshima | |
| 2006/0234679 | A1 | 10/2006 | Matsumoto et al. | |
| 2007/0188303 | A1 * | 8/2007 | Faro et al. ..................... | 340/5.73 |
| 2007/0195957 | A1 * | 8/2007 | Arulambalam et al. ...... | 380/277 |
| 2007/0234067 | A1 * | 10/2007 | Nanavati et al. .............. | 713/186 |

(Continued)

FOREIGN PATENT DOCUMENTS

EP 1383266 A 1/2004

OTHER PUBLICATIONS

Extended European Search Report, Application No. 09152627.7, dated Apr. 27, 2009.

*Primary Examiner* — Dede Zecher
*Assistant Examiner* — Abdullah Almamun
(74) *Attorney, Agent, or Firm* — Ridout & Maybee LLP (57) ABSTRACT

Rather than storing all data in the same manner, e.g., an encrypted manner, a security level with which to associate received data of a given type may be determined. Subsequently, distinct types of data may be stored in a distinct manner, with the manner of storage having a security level appropriate to the type of data. For example, a first type of data may be stored in an encrypted manner (i.e., with a high level of security), while a second level of data may be stored in a plain text manner (i.e., with a low level of security).

21 Claims, 7 Drawing Sheets

(56) References Cited

U.S. PATENT DOCUMENTS

| | | |
|---|---|---|
| 2008/0087720 A1* | 4/2008 | Levitov ........................ 235/379 |
| 2008/0125084 A1 | 5/2008 | Cambois et al. |
| 2008/0227432 A1 | 9/2008 | Lavabre et al. |
| 2009/0204806 A1* | 8/2009 | Kanemura et al. ............ 713/155 |
| 2009/0235068 A1* | 9/2009 | Song et al. .................... 713/156 |
| 2009/0245522 A1* | 10/2009 | Kudo et al. .................... 380/280 |
| 2010/0138667 A1* | 6/2010 | Adams et al. ................. 713/186 |
| 2012/0294445 A1* | 11/2012 | Radutskiy et al. ............ 380/278 |

* cited by examiner

MULTI-LEVEL DATA STORAGE

FIELD

The present application relates generally to data storage and, more specifically, to multi-level data storage.

BACKGROUND

Biometric authentication relates to automatically and uniquely recognizing humans based upon one or more intrinsic physical or behavioral traits. Biometric authentication often involves technologies that measure and analyze human physical and behavioral characteristics. Examples of physical characteristics include fingerprints, retinas, irises, facial patterns and hand measurements, while examples of mostly behavioral characteristics include signature, gait and typing patterns. Voice is considered a mix of both physical and behavioral characteristics.

To obtain access to a secure device, a user provides a candidate physical characteristic (e.g., a biometric candidate). Authenticating the user involves comparing the biometric candidate to a previously recorded, corresponding authentication template (e.g., a biometric template). To facilitate this comparison, the previously recorded, corresponding biometric entry may be digitized and stored as the biometric template. Additionally, collection of a biometric candidate from the user involves obtaining a digital representation of one or more physical characteristics of the user.

In many instances, the device that obtains a biometric candidate is different from the device that uses the biometric candidate to authenticate a user and these devices may be distinct from a further device that stores biometric templates necessary for comparison during authentication.

A smart card generally comprises a pocket-sized card with an embedded integrated circuit that can process information. Smart cards provide storage of user and account identity and, as such, smart cards often provide storage of biometric templates.

Biometric templates are just one example of data for which secure storage may be desired.

BRIEF DESCRIPTION OF THE DRAWINGS

Reference will now be made to the drawings, which show by way of example, embodiments of the present disclosure, and in which.

DETAILED DESCRIPTION OF THE EMBODIMENTS

A handheld mobile communication device may be constructed efficiently, with a focus on size and shape while including hardware suitable for tasks most commonly expected from the device. In the case wherein a particular user wishes to expand the functionality of the device, a peripheral device may be employed. The peripheral device may, for example, communicate with the handheld mobile communication device over a wired communication link or a wireless communication link. It may that the handheld mobile communication device has established a wireless communication link with the peripheral device and, responsive to user inaction or responsive to a specific instruction from a user, the handheld mobile communication device may be placed in a "locked" operational mode, in which mode functionality of the mobile device is reduced. Such an operational mode of reduced functionality often involves, in part, discontinuing communication over the wireless communication link.

Ahead of entering the operational mode of reduced functionality, the handheld mobile communication device may store "state data", that is, data about the state of the wireless communication link. Such state data may be useful in allowing the handheld mobile communication device to readily resume the wireless communication link. The state data may be stored in a non-volatile portion of a flash memory so that, even upon a hard reset to, say, implement an upgrade to an operating system, the state data can persist and the user is saved the hassle of manually reestablishing the wireless communication link. The state data may include: sensitive data useful for authentication, such as biometric templates and password hashes; and connection information, useful for reestablishing a disconnected connection to the peripheral device. Due to much of the state data being sensitive, it has been recognized that the state data should be stored in an encrypted manner. That is, the state data may be stored in such a way that the state data is indecipherable without use of authentication input (e.g., a device password, provided to the device by a user).

A user may gain access to the device by providing a correct device password responsive to a device password prompt. Conveniently, responsive to the receipt of the correct device password, an authentication process may change a mode of operation for the mobile device to an "unlocked" mode, in which mode users are allowed access to select functions and applications executed on the device and data stored on the device. Recent developments have allowed for a user to use a peripheral device to provide information that may be used by the device to access the device password so that the device password may then be used to change the operational mode of the device, thereby bypassing the device password prompt. This may be called a "Hidden Password" feature.

One problem arises in a case wherein a device is configured to store state data in an encrypted manner and is configured to use the Hidden Password feature. The encrypted state data may be required to reestablish a connection between the mobile device and the peripheral device. However, the connection between the mobile device and the peripheral device may be required to be reestablished to allow the mobile device to receive the information from the peripheral device and use the information to obtain the device password to unlock the encrypted data.

Rather than storing all data in the same manner, e.g., an encrypted manner, a security level with which to associate received data of a given type may be determined. Subsequently, distinct types of data may be stored in a distinct manner, with the manner of storage having a security level appropriate to the type of data. For example, a first type of data may be stored in an encrypted manner (i.e., with a high level of security), while a second level of data may be stored in a plain text manner (i.e., with a low level of security).

According to an aspect of the present disclosure, there is provided, at a computing device, a method of storing data in a non-volatile memory of the computing device. The method comprises receiving data of a first type, determining that the data of the first type is to be stored subject to a first level of security, storing the data of the first type in a first portion of the non-volatile memory that is subject to the first level of security, receiving data of a second type, determining that the data of the second type is to be stored subject to a second level of security, wherein the second level of security is distinct from the first level of security and storing the data of the first type in a second portion of the non-volatile memory that is subject to the second level of security. In other aspects of the present application, a computing device is provided for carrying out this method and a computer readable medium is provided for adapting a processor to carry out this method.

According to another aspect of the present disclosure, there is provided, at a computing device, a method of facilitating an operational mode change for the computing device. The method comprises receiving a cryptographic key, decrypting, using the cryptographic key, data stored in a first-level security portion of a memory, thereby producing a decrypted device password, decrypting, using the decrypted device password, data stored in a second-level security portion of the memory, thereby producing an authentication template, the second-level security being higher than the first-level security, transmitting the authentication template over a connection to a peripheral device, receiving, from the peripheral device, an indication of biometric authentication success and responsive to receiving the indication, changing a mode of operation for the computing device to increase access to execution of applications. In other aspects of the present application, a computing device is provided for carrying out this method and a computer readable medium is provided for adapting a processor to carry out this method.

Other aspects and features of the present disclosure will become apparent to those of ordinary skill in the art upon review of the following description of specific embodiments in conjunction with the accompanying figures.

Figure 1:
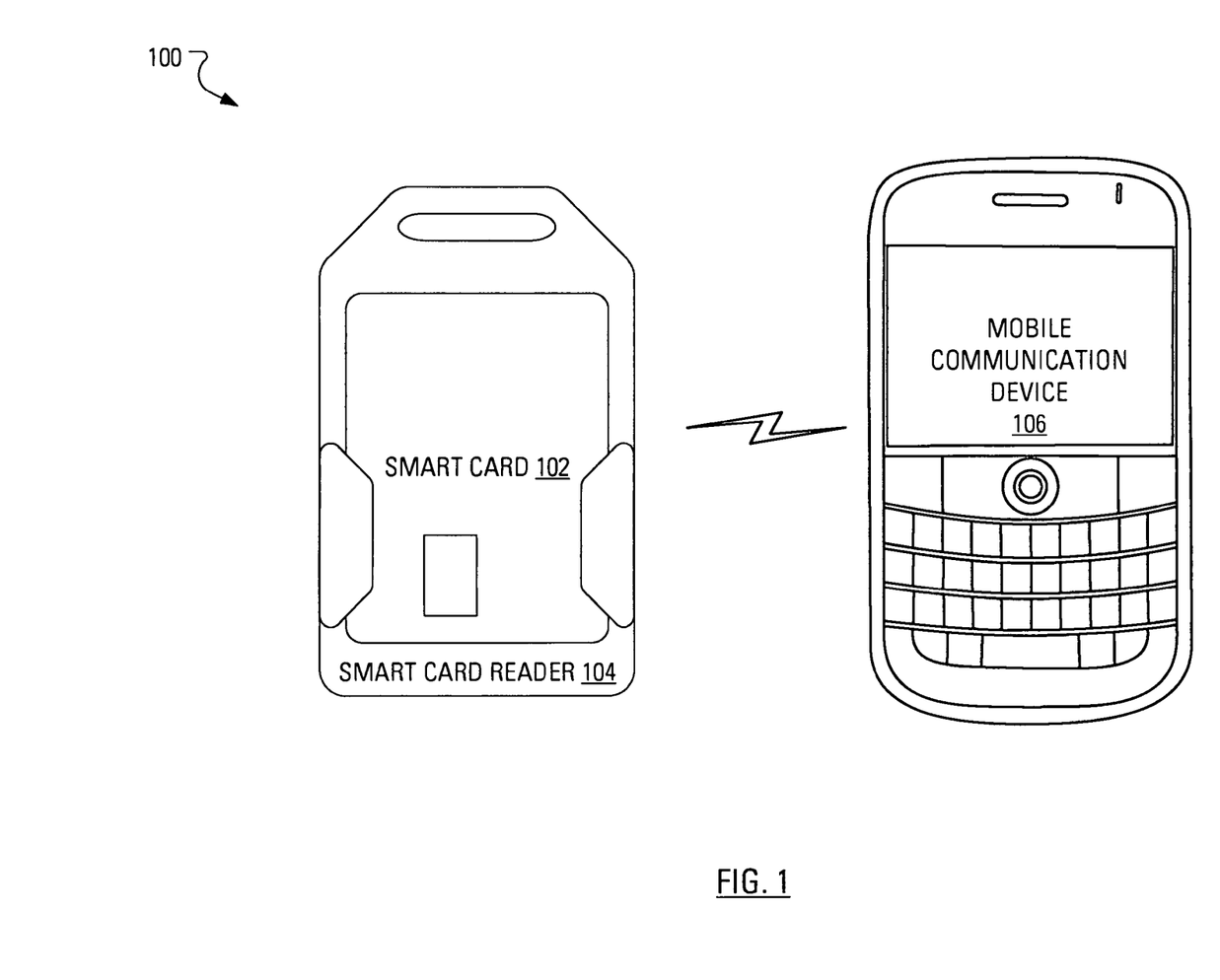
FIG. 1 illustrates an environment in which a smart card is illustrated along with a mobile communication device that communicates wirelessly with a smart card reader.

FIG. 1 illustrates an exemplary communication system 100 that includes a mobile communication device 106 that is enabled to communicate wirelessly with a peripheral device in the form of a smart card reader 104. A smart card 102 is illustrated mounted in the smart card reader 104. The smart card 102 may be considered to be an embodiment of an element that may, more generically, be known as an identity verification element.

Figure 2:
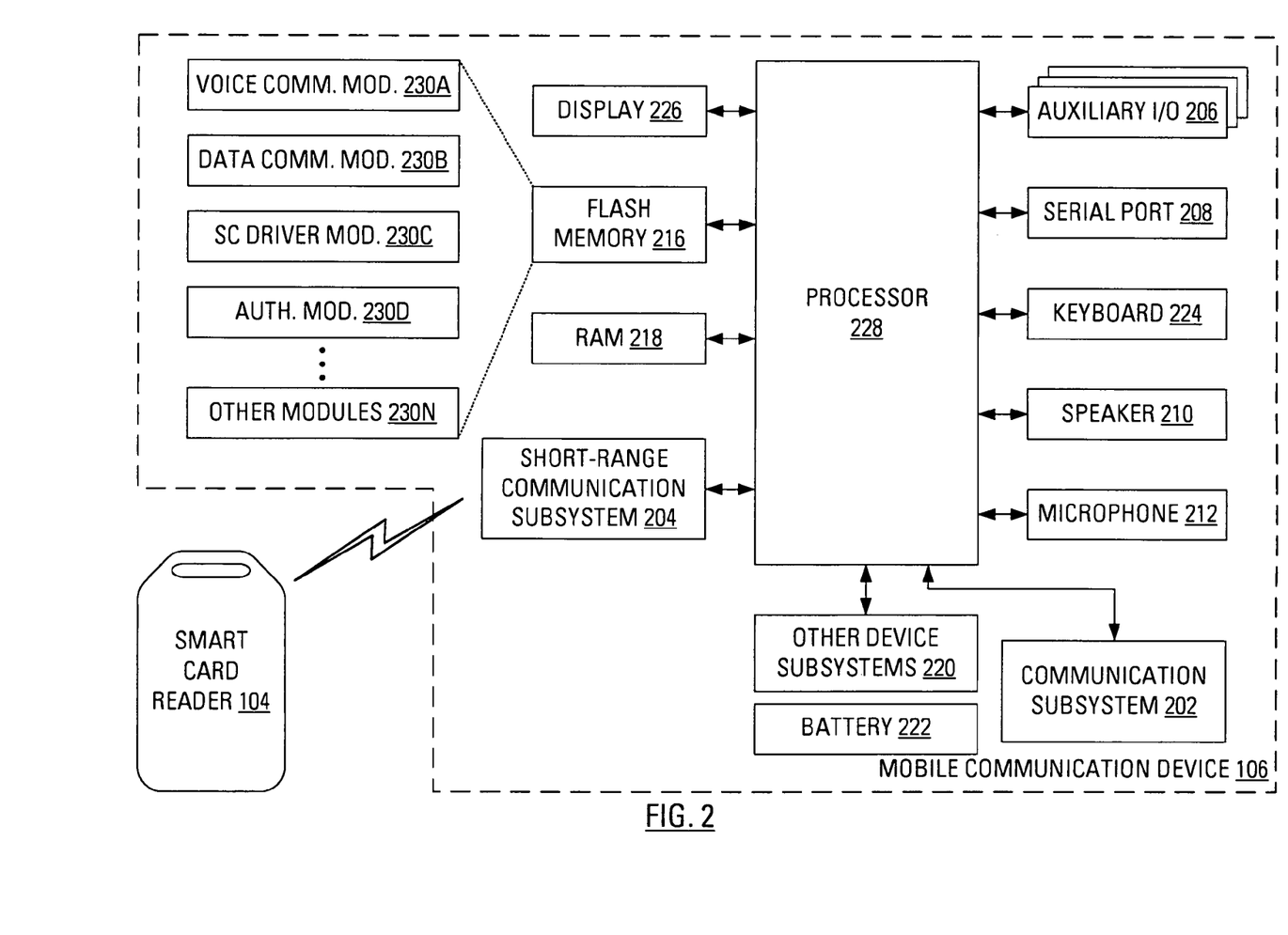
FIG. 2 schematically illustrates the mobile communication device of FIG. 1.

FIG. 2 illustrates the mobile communication device 106 including a housing, an input device (e.g., a keyboard 224 having a plurality of keys) and an output device (e.g., a display 226), which may be a full graphic, or full color, Liquid Crystal Display (LCD). In some embodiments, the display 226 may comprise a touchscreen display. In such embodiments, the keyboard 224 may comprise a virtual keyboard. Other types of output devices may alternatively be utilized. A processing device (a mobile device processor 228) is shown schematically in FIG. 2 as coupled between the keyboard 224 and the display 226. The mobile device processor 228 controls the operation of the display 226, as well as the overall operation of the mobile communication device 106, in part, responsive to actuation of the keys on the keyboard 224 by a user. Notably, the keyboard 224 may comprise physical buttons (keys) or, where the display 226 is a touchscreen device, the keyboard 224 may be implemented, at least in part, as "soft keys". Actuation of a so-called soft key involves either touching the display 226 where the soft key is displayed or actuating a physical button in proximity to an indication, on the display 226, of a temporary action associated with the physical button.

The housing may be elongated vertically, or may take on other sizes and shapes (including clamshell housing structures). Where the keyboard 224 includes keys that are associated with at least one alphabetic character and at least one numeric character, the keyboard 224 may include a mode selection key, or other hardware or software, for switching between alphabetic entry and numeric entry.

In addition to the mobile device processor 228, other parts of the mobile communication device 106 are shown schematically in FIG. 2. These may include a communications subsystem 202, a short-range communications subsystem 204, the keyboard 224 and the display 226. The mobile communication device 106 may further include other input/output devices such as a set of auxiliary I/O devices 206, a serial port 208, a speaker 210 and a microphone 212. The mobile communication device 106 may further include memory devices including a flash memory 216 and a mobile device Random Access Memory (RAM) 218. Furthermore, the mobile communication device 106 may include various other device subsystems 220. The mobile communication device 106 may have a battery 222 to power the active elements of the mobile communication device 106. The mobile communication device 106 may, for instance, comprise a two-way radio frequency (RF) communication device having voice and data communication capabilities. In addition, the mobile communication device 106 may have the capability to communicate with other computer systems via the Internet.

Operating system software executed by the mobile device processor 228 may be stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the mobile device RAM 218. Communication signals received by the mobile device may also be stored to the mobile device RAM 218.

The mobile device processor 228, in addition to its operating system functions, enables execution of software applications on the mobile communication device 106. A predetermined set of software applications that control basic device operations, such as a voice communications module 230A and a data communications module 230B, may be installed on the mobile communication device 106 during manufacture. A smart card (SC) driver module 230C may also be installed on the mobile communication device 106 during manufacture. Furthermore, an authentication module 230D may also be installed on the mobile communication device 106 to implement aspects of the present disclosure. As well, additional software modules, illustrated as another software module 230N, which may be, for instance, a personal information manager (PIM) application, may be installed during manufacture. The PIM application may be capable of organizing and managing data items, such as e-mail messages, calendar events, voice mail messages, appointments, and task items. The PIM application may also be capable of sending and receiving data items via a wireless carrier network. The data items managed by the PIM application may be seamlessly integrated, synchronized and updated via the wireless carrier network with the device user's corresponding data items stored or associated with a host computer system.

Communication functions, including data and voice communications, may be performed through the communication subsystem 202 and through the short-range communications subsystem 204.

The short-range communications subsystem 204 enables communication between the mobile communication device 106 and other proximate systems or devices, which need not necessarily be similar devices. For example, the short-range communications subsystem 204 may include a Bluetooth™ communication module to provide for communication with the smart card reader 104 where the smart card reader 104 also implements a Bluetooth™ communication module. As another example, the short-range communications subsystem 204 may include an infrared device to provide for communication with similarly-enabled systems and devices.

Figure 3:
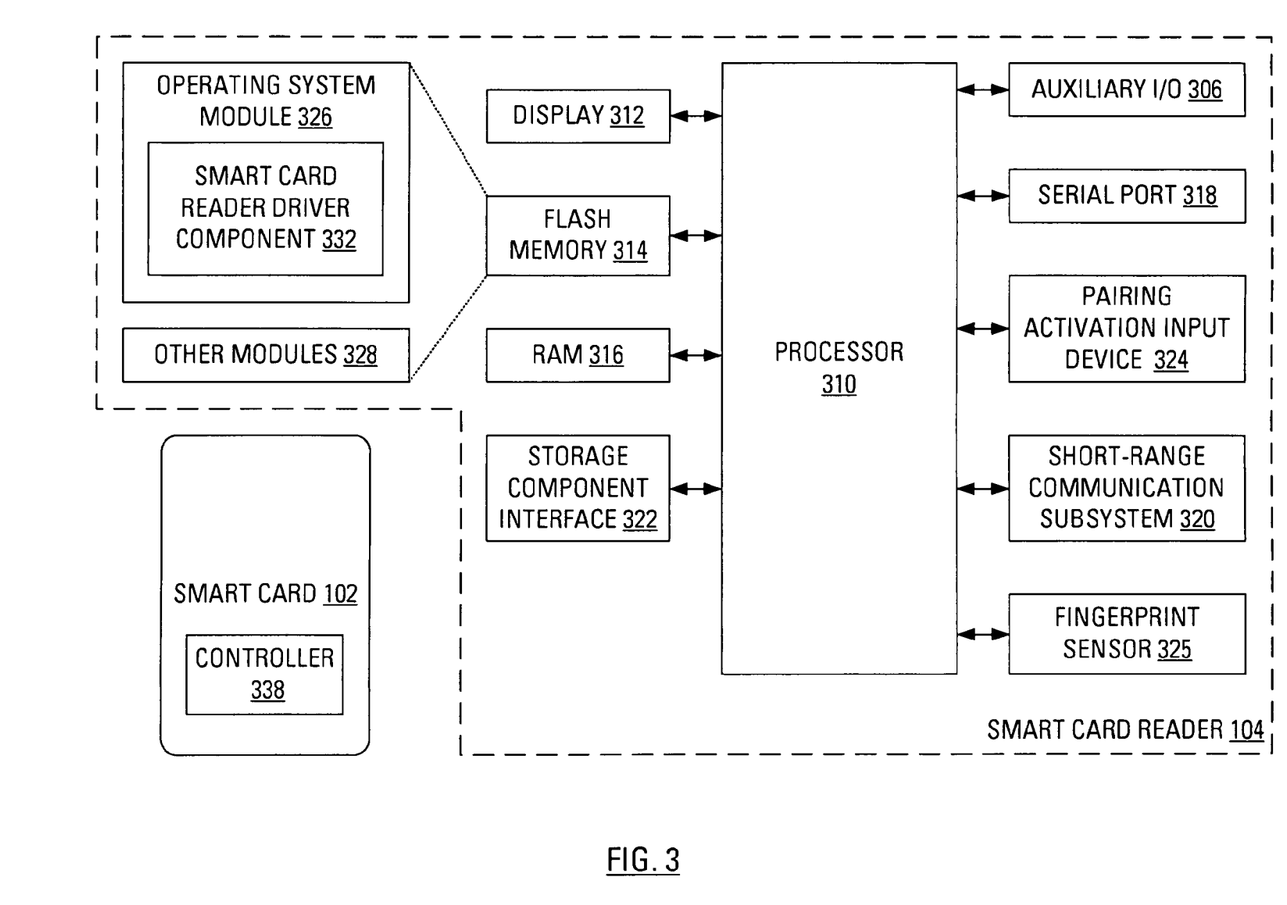
FIG. 3 schematically illustrates the smart card reader of FIG. 1.

FIG. 3 illustrates an example embodiment of the smart card reader 104. The smart card reader 104 includes a controller including at least one smart card reader processor 310, which is suitably programmed to control the overall operation and functions of the smart card reader 104. The smart card reader 104 may also include an output device (e.g., a display module 312). The smart card reader 104 may further include peripheral devices or subsystems such as a flash memory 314, a smart card reader RAM 316, a serial port 318 (e.g., a Universal Serial Bus, or "USB", port), a smart card reader short-range communications subsystem 320 (e.g., an infrared transceiver, wireless bus protocol system using a protocol such as a Bluetooth™), a storage component interface 322 (e.g., for a memory card or any other data storage device), a pairing-activation input device 324 (e.g., a push button) and a biometric information input device 325 (e.g., a fingerprint sensor). In some embodiments, the smart card reader RAM 316 includes a portion allocated to a data cache.

There exist many form factors for fingerprint input devices. One example fingerprint input device has a bar shape. A silicon sensor records a plurality of images as a user swipes a finger across the bar. The silicon sensor then generates an image of the finger from the plurality of images. Another example fingerprint input device has a pad shape. A sensor generates an image as a user holds a finger on the pad, which is designed with a size to accommodate an entire fingerprint.

The smart card reader processor 310 operates under stored program control with code or firmware being stored in the flash memory 314 (or other type of non-volatile memory device or devices). As depicted in FIG. 3, the stored programs (e.g., firmware) include an operating system program or code module 326 and other programs or software application modules indicated generally by reference 328. The operating system module 326 of the smart card reader 104 further includes a smart card reader driver component 332.

The smart card reader driver component 332 is responsible for coordinating communications between the smart card reader 104 and the smart card 102 and/or the smart card driver module 230C of the mobile communication device 106. Based on results of various communications with the smart card reader 104, the smart card driver module 230C maintains a record of the state of the smart card 102. The operating system module code 326, code for specific device application modules 328, code for the smart card reader driver component 332, or code components thereof, may be temporarily loaded into a volatile storage medium such as the smart card reader RAM 316. Received communication signals and other data may also be stored in the smart card reader RAM 316. Additionally, the storage component interface 322 receives the smart card 102, which may provide additional storage space for the smart card reader 104.

In one embodiment, the smart card 102 has a controller 338 responsible for coordinating communications between the smart card 102 and the smart card reader driver component 332 of the smart card reader 104.

The stored program control (i.e., software application modules 328) for the smart card reader processor 310 may include a predetermined set of applications, code components or software modules that control basic device operations, for example, management and security related control of the data of the smart card reader 104, and may be installed on the smart card reader 104 as a component of the software application modules 328 during the manufacturing process. Further applications may also be loaded (i.e., downloaded) onto the smart card reader 104 through the operation of the serial port 318, the smart card reader short-range communications subsystem 320 or from the smart card 102. The downloaded code modules or components may then be installed by the user (or automatically) in the smart card reader RAM 316 or non-volatile program memory (e.g., the flash memory 314).

While the smart card reader driver component 332 is shown to be an integrated portion of the operating system 326 for security purposes (e.g., individuals are not permitted to tamper with the smart card reader driver component 332), the smart card reader driver component 332 may be installed as one of the software applications 328 so long as suitable security related precautions are taken to ensure that the smart card reader driver component 332 cannot be modified or tampered with by unauthorized users.

The serial port 318 may be a USB-type interface port for interfacing or synchronizing with another device, such as a personal computer or the mobile communication device 106. The serial port 318 is used to set preferences through an external device or software application or exchange data with a device, such as the mobile communication device 106. Such data may be stored on the smart card 120 that is plugged into the storage component interface 322 of the smart card reader 104. The serial port 318 is also used to extend the capabilities of the smart card reader 104 by providing for downloads, to the smart card reader 104, of information or software, including user interface information.

The short-range communications subsystem 320 provides an interface for communication between the mobile communication device 106 or personal computer and the smart card reader 104. In one embodiment, the short-range communications subsystem 320 employs an infrared communication link or channel. In another embodiment, the short-range communications subsystem 320 operates according to a wireless radio frequency bus protocol, such as Bluetooth™. However, the short-range communications subsystem 320 may operate according to any suitable local wired or wireless communication protocol, so long as the short-range communications subsystem 204 (FIG. 2) of the mobile communication device 106 operates using the same protocol, thereby facilitating wireless communication between the mobile communication device 106 and the smart card reader 104. Any communications mechanism and/or protocol may be implemented for the short-range communications subsystems 204, 320, so long as the mobile communication device 106 can communicate with the smart card reader 104 when the mobile communication device 106 is no more than a predetermined distance away from the smart card reader 104.

In one embodiment, the smart card 102 may be compliant with a Federal Information Processing Standards Publication (FIPS) standard. For example, FIPS 201 is a United States federal government standard that specifies Personal Identity Verification (PIV) requirements for Federal employees and contractors. It is forecast that Personal Identity Verification (PIV) Cards will be deployed to all US government employees (in the millions) over the next few years.

In operation, through interaction with a security user interface, the user establishes a device password to be used to unlock the mobile communication device 106. Recent developments have allowed for the mobile communication device 106 to unlock itself responsive to a user inputting authentication data at the biometric information input device 325 of the smart card reader 104, thereby bypassing the device password prompt. This may be called a "Hidden Password" feature.

When the Hidden Password feature is disabled and the user wishes to unlock the mobile communication device, the user inputs a device password responsive to a device password prompt. An authentication process executed on the mobile device processor 228 receives the device password as input and determines whether the received password matches the previously configured device password. Upon determining that the received password matches the previously configured device password, the authentication process unlocks the mobile communication device 106. In part, unlocking the mobile communication device 106 involves providing, to the user and to processes executed on the mobile device processor 228, access to encrypted data stored on the mobile communication device 106.

The Hidden Password feature may be configured as follows. Through interaction with the security user interface, the user may indicate that the Hidden Password feature is to be activated. Responsive to this activation, the mobile device processor 228 generates a cryptographic encryption key. An example encryption key may be generated according to the Advanced Encryption Standard (AES), announced by the US National Institute of Standards and Technology as Federal Information Processing Standards (FIPS) 197. In particular, a 256-bit AES encryption key may considered suitable. The mobile device processor 228 may then use the encryption key to encrypt the device password and store the encrypted device password locally at the mobile communication device 106, e.g., in the mobile device flash memory 216 (see FIG. 2). More particularly, the mobile device processor 228 may store the encrypted device password a non-volatile portion of the mobile device flash memory 216. The non-volatile portion is advantageous in that the data stored therein is maintained even through a device reset. The mobile device processor 228 may then transmit the encryption key to the smart card reader 104 for storage.

In addition, the mobile device processor 228 may, if it has not already, communicate with the smart card reader 104 to obtain one or more biometric templates from storage on the smart card 102. Upon receipt of the one or more biometric templates from the smart card reader 104, the mobile device processor 228 may store the biometric templates locally at the mobile communication device 106, e.g., in the mobile device flash memory 216.

In an example scenario, the mobile communication device 106 is locked and a user is attempting to unlock the mobile communication device 106. Such an attempt may begin with the user interacting with a user interface on the mobile communication device 106. More particularly, responsive to receiving input while locked, the mobile device processor 228 may arrange the presentation of a dialog on the display 226. The dialog may include an option to "Unlock Device". Notably, a user may bypass the dialog to unlock the mobile communication device 106 by simply inputting the correct device password.

In operation, the Hidden Password feature progresses as follows. Initially, the mobile device processor 228 receives an indication of user initiation of a device unlock procedure, e.g., the authentication process executed on the mobile device processor 228 receives an indication that the user has selected the "Unlock Device" option in the presented dialog.

Rather than prompt the user for the device password, the authentication process prompts the user to provide authentication criteria to the smart card reader 104. Provision, by the user, of the authentication criteria allows the smart card reader 104 to produce a biometric candidate. For example, the user may swipe a finger across the fingerprint sensor 325, thereby allowing the smart card reader 104 to produce a fingerprint candidate. Responsive to producing the biometric candidate, the smart card reader processor 310 may arrange transmission of the encryption key to the mobile communication device 106. Responsive to receiving the encryption key, the authentication process executed on the mobile device processor 228 may use the encryption key to decrypt the device password.

The authentication process may then determine whether the decrypted password matches the previously configured device password. Upon determining that the decrypted password matches the previously configured device password, the authentication process may pass the stored biometric template to the smart card reader 104. An application executed on the smart card reader processor 310 may then compare the biometric candidate, received from the biometric information input device 325, to the biometric template received from the mobile communication device 106. Upon determining that the comparing yielded a match, the smart card reader 104 may transmit an indication of the match to the mobile communication device 106. Upon receiving such an indication, the authentication process may unlock the mobile communication device 106.

Upon determining that the comparing did not yield a match, the smart card reader 104 may transmit an indication of the failure to match to the mobile communication device 106. Upon receiving such an indication, the authentication process may arrange presentation of a dialog on the display 226, where the dialog indicates that the attempt to unlock the device was unsuccessful.

As mentioned above, data stored in the mobile device flash memory 216 may include biometric templates received from the smart card 102 via the smart card reader 104 and the encrypted device password. The data stored in the mobile device flash memory 216 may also include information about the location of the encrypted device password as well as information about the connection between the mobile communication device 106 and the smart card reader 104. For example, such connection information may comprise a Bluetooth™ address for the smart card reader 104.

As it may be considered insecure to store biometric templates in the mobile device flash memory 216 without encryption, additional security may be realized by encrypting all data with the device password.

However, as mentioned above, when all data is stored in an encrypted manner and the mobile communication device 106 is locked, the mobile communication device 106 is prevented from establishing a connection with the smart card reader 104. As a result, the mobile communication device 106 is prevented from receiving the decryption key from the smart card reader 104 that would be transmitted responsive to the user providing authentication criteria. Thus, the encryption of all data may be considered to be incompatible with the Hidden Password feature.

In overview, rather than storing all data in the same manner, e.g., in an encrypted manner, data may be divided into levels and then stored such that distinct levels of data are stored in a distinct manner. For example, a first level of data may be stored in an encrypted manner, while a second level of data may be stored in a plain text manner.

Figure 4:
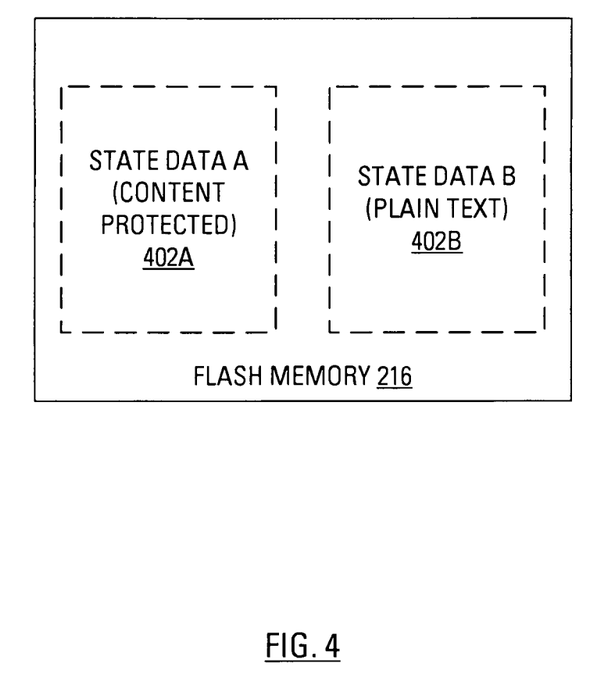
FIG. 4 schematically illustrates flash memory within the mobile communication device of FIG. 1, according to an embodiment of the present disclosure.

FIG. 4 illustrates the mobile device flash memory 216 with multiple portions defined. In particular, there is a Data A portion 402A and a Data B portion 402B. According to aspects of the present disclosure, data in the Data A portion 402A of the mobile device flash memory 216 is to be subject to encryption, while data in the Data B portion 402B of the mobile device flash memory 216 is to remain free of encryption. Security-sensitive data, such as biometric templates, may be stored in the Data A portion 402A. Security-insensitive data, such as the location of the encrypted device password, the encrypted device password and information related to connecting to the smart card reader 104, may be stored in the Data B portion 402B.

Figure 5:
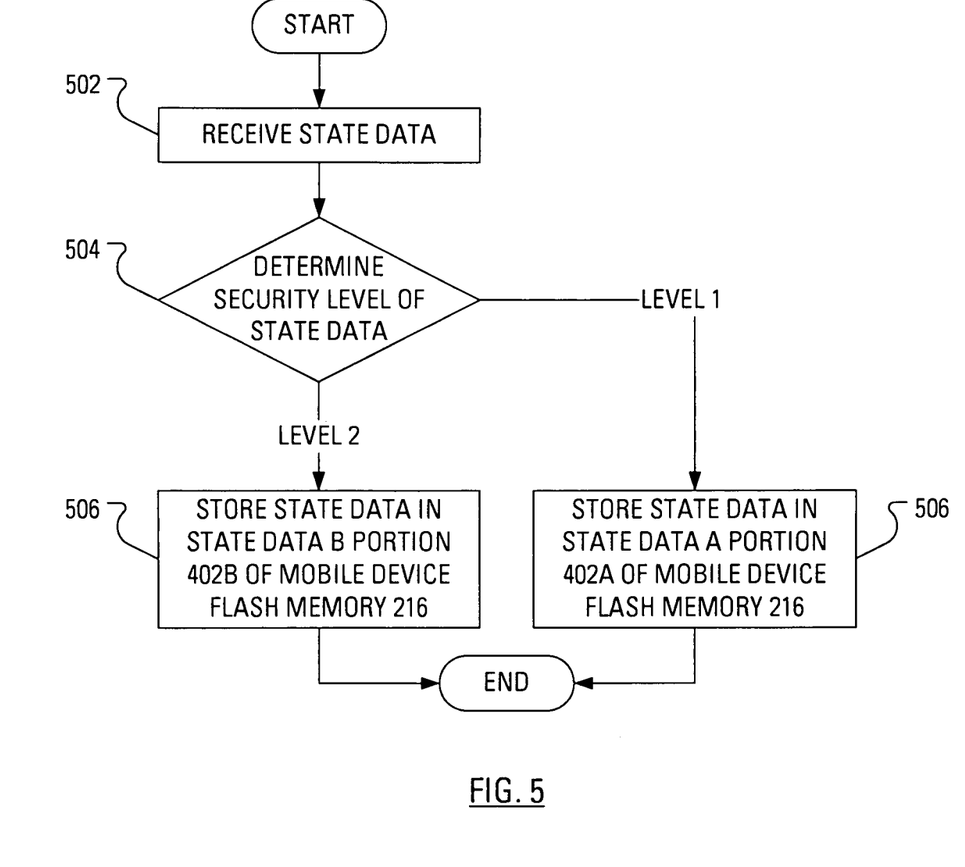
FIG. 5 illustrates example steps in a method of storing data with distinct levels of security.

FIG. 5 illustrates example steps in a method of storing data with distinct levels of security. Initially, the authentication process may receive (step 502) data for storage. The data may be associated with meta data. The meta data may indicate such properties of the data as whether the data should be stored in non-volatile memory and whether the data should be stored subject to a given level of security. The authentication process may be configured, according to aspects of the present disclosure, to determine (step 504), based on the meta data, a security level to associate with the received data. Upon determining (step 504) that the data is to be associated with a first (high) level of security, the authentication process may store the data in the Data A portion 402A of the mobile device flash memory 216. Upon determining (step 504) that the data is to be associated with a second (low) level of security, the authentication process may store the data in the Data B portion 402B of the mobile device flash memory 216. Notably, there may be more levels of security than the two provided in this example, thereby providing a gradation of security levels for distinct types of data.

Figure 6:
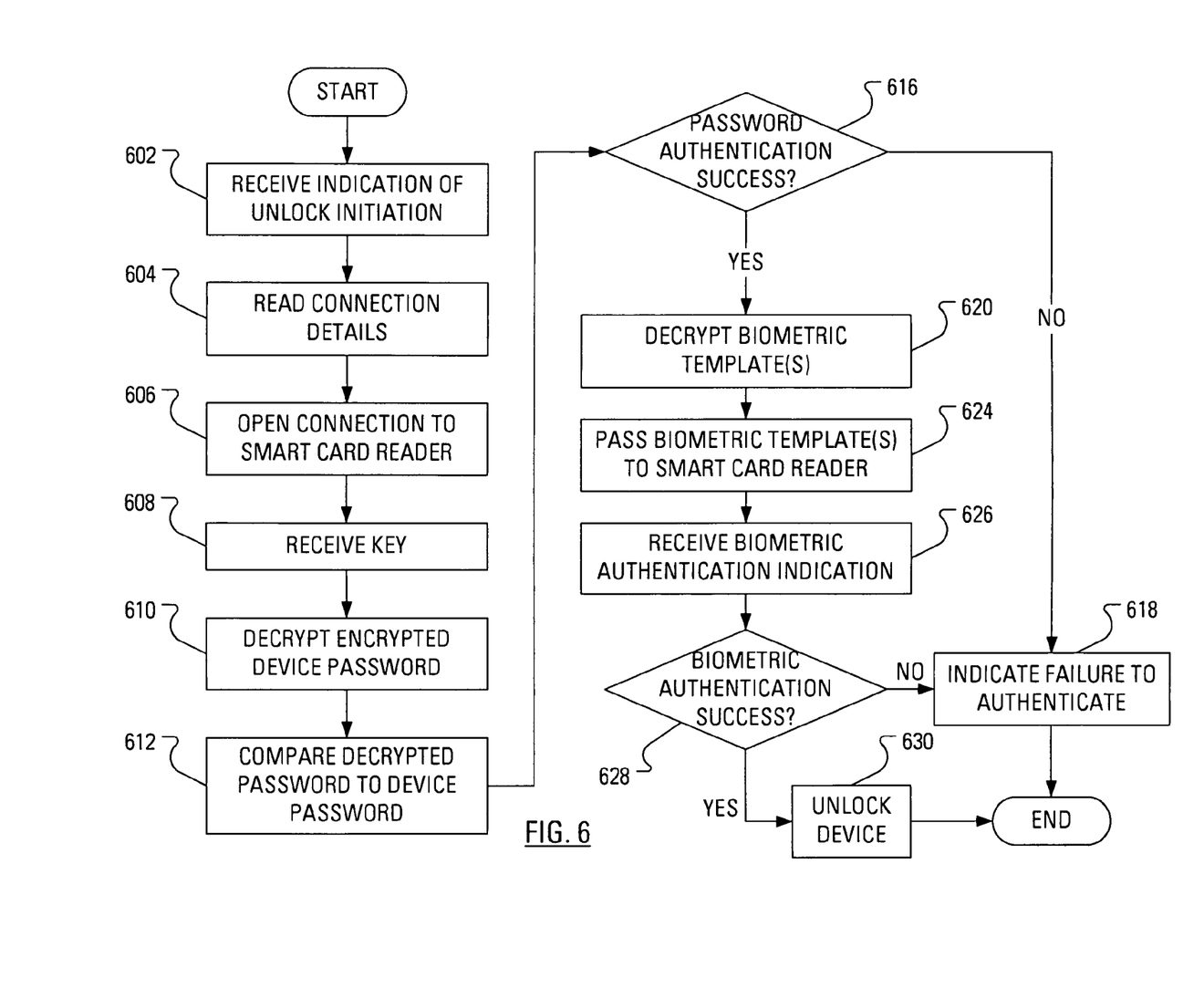
FIG. 6 illustrates example steps in a method, carried out by the mobile communication device of FIG. 1, of authenticating a user that is attempting to change a mode of operation for the mobile communication device of FIG. 1 according to an embodiment of the present disclosure.

FIG. 6 illustrates example steps in a method of authenticating the user that is attempting to unlock the mobile communication device 106. Initially, the mobile device processor 228 receives (step 602) an indication of user initiation of a device unlock procedure, e.g., the authentication process executed on the mobile device processor 228 receives an indication that the user has selected the "Unlock Device" option in the presented dialog. The authentication process reads (step 604) connection details from the Data B portion 402B of the mobile device flash memory 216 and uses the connection details to open (step 606) a connection to the smart card reader 104 and transmit a request for the encryption key used to encrypt the device password.

Figure 7:
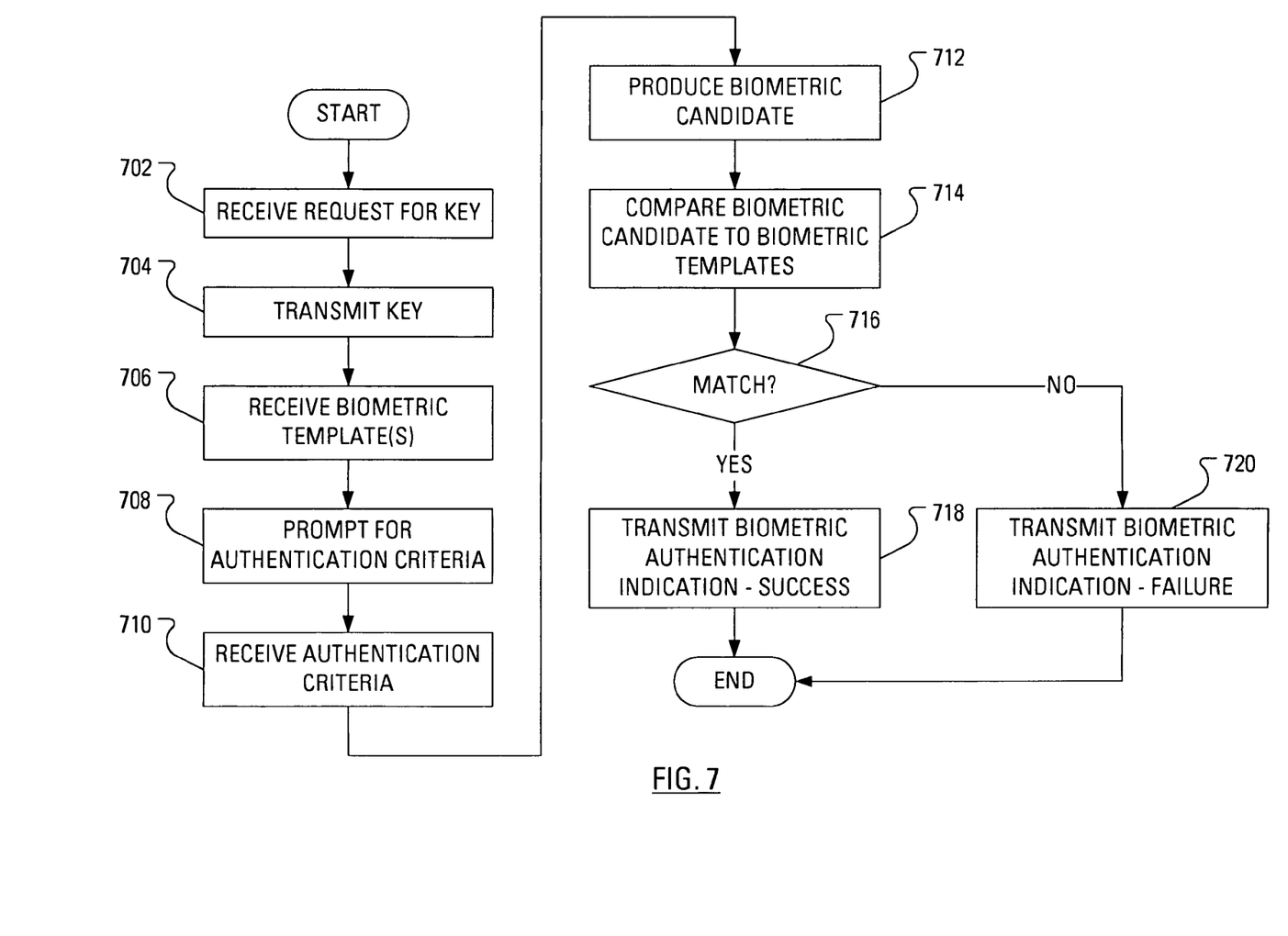
FIG. 7 illustrates example steps in a method of facilitating, at the smart card reader of FIG. 1, authentication of the user of the mobile communication device of FIG. 1.

FIG. 7 illustrates example steps in a method of facilitating, at the smart card reader 104, authentication of the user of the mobile communication device 106. Initially, the smart card reader 104 receives (step 702) a request for the encryption key. Responsive to receiving the request, the smart card reader processor 310 may arrange transmission (step 704) of the encryption key to the mobile communication device 106.

Returning to FIG. 6, once the connection to the smart card reader 104 has been opened, the authentication process receives (step 608), from the smart card reader 104, the encryption key previously used to encrypt the device password. The authentication process may store the received encryption key in the mobile device RAM 218.

The authentication process may then use the key received in step 608 to decrypt (step 610) the encrypted device password that is stored in the Data B portion 402B (FIG. 4). The authentication process may then compare (step 612) the decrypted password to the previously configured device password. Upon determining (step 616) that the decrypted password did not match the previously configured device password, the authentication process may arrange the presentation of a dialog on the display 226, where the dialog indicates (step 618) a failure to authenticate the user.

Upon determining (step 616) that the decrypted password matches the previously configured device password, the authentication process may use the recently-decrypted device password to decrypt (step 620) the one or more biometric templates stored in the Data A portion 402A of the mobile device flash memory 216.

Upon decrypting (step 620) the one or more biometric templates, the authentication process may transmit (step 622) the one or more biometric templates to the smart card reader 104.

Returning to FIG. 7, the smart card reader 104 receives (step 706) the one or more biometric templates and prompts (step 708) the user to provide authentication criteria. As the user responds to the prompt and provides the authentication criteria, the biometric information input device 325 at the smart card reader 104 receives (step 710) the authentication criteria and produces (step 712) a biometric candidate based on the authentication criteria.

The smart card reader 104 then compares (step 714) the biometric candidate generated in step 712 to the one or more biometric templates received in step 706.

The smart card reader processor 310 may then determine (step 716) whether the comparing step (step 714) yielded a match. Upon determining (step 716) that the comparing step (step 716) yielded a match, the smart card reader processor 310 may transmit (step 718), to the mobile communication device, an indication of authentication success.

Upon determining (step 716) that the comparing step (step 714) did not yield a match, the smart card reader processor 310 may transmit (step 720), to the mobile communication device, an indication of authentication failure.

Returning to FIG. 6, the authentication process receives (step 626) the biometric authentication indication and determines (step 628) whether the biometric authentication was successful. Upon determining (step 628), based on the biometric authentication indication, that the biometric authentication failed, the authentication process may indicate (step 618) failure to authenticate the user.

Upon determining (step 628), based on the biometric authentication indication, that the biometric authentication succeeded, the authentication process may unlock (step 630) the mobile communication device 106.

Conveniently, the next time the mobile communication device 106 locks itself, the data stored in the mobile device RAM 218 (i.e., the received encryption key and biometric template) may be deleted (cleaned up) by the authentication process. Additionally convenient are the aspects of the present disclosure that maintain sensitive data in an encrypted manner.

The authentication process may be configured, according to aspects of the present disclosure, to distinguish between data that is sensitive, and should be stored in the Data A portion 402A, and data that is non-sensitive, and should stored in the Data B portion 402B.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. At a computing device, a method of storing data in a non-volatile memory of said computing device, said method comprising:
   receiving, from a peripheral device, data of a first type;
   determining that said data of said first type is to be stored subject to a first level of security;
   responsive to said determining, encrypting said data of said first type to obtain encrypted data of said first type;
   storing said encrypted data of said first type in a first portion of said non-volatile memory;
   receiving state data used for reestablishing a communication link between said computing device and said peripheral device, said state data including connection details of a previously established communication link between said computing device and said peripheral device;
   determining that said state data used for reestablishing said communication link is to be stored subject to a low level of security; and
   responsive to said determining, storing said state data used for reestablishing said communication link in a second portion of said non-volatile memory as plain text.

2. The method of claim 1 wherein a device password may be used to change an operational mode of said computing device and said method further comprises storing an encrypted version of said device password.

3. The method of claim 1 wherein said data of said first type comprises authentication template data.

4. The method of claim 3 wherein said authentication template data comprises biometric template data.

5. The method of claim 4 wherein said biometric template data comprises fingerprint template data.

6. The method of claim 1 further comprising basing said determining that said data of said first type is to be stored subject to said first level of security on meta data associated with said data of said first type.

7. The method of claim 1 further comprising basing said determining that said state data used for reestablishing said communication link between said computing device and said peripheral device is to be stored subject to a low level of security on meta data associated with said state data used for reestablishing said communication link between said computing device and said peripheral device.

8. A computing device comprising a processor operable to execute an authentication process to:
   receive, from a peripheral device, data of a first type;
   determine that said data of said first type is to be stored subject to a first level of security;
   encrypt said data of said first type to obtain encrypted data of said first type;
   store said encrypted data of said first type in a first portion of a non-volatile memory;
   receive state data used for reestablishing a communication link between said computing device and said peripheral device, said state data including connection details of a previously established communication link between said computing device and said peripheral device;
   determine that said state data used for reestablishing said communication link is to be stored subject to a low level of security; and
   store, responsive to said determining, said state data used for reestablishing said communication link in a second portion of said non-volatile memory as plain text.

9. A non-transitory computer-readable medium containing computer-executable instructions that, when performed by a processor, cause said processor to:
   receive, from a peripheral device, data of a first type;
   determine that said data of said first type is to be stored subject to a first level of security;
   encrypt said data of said first type to obtain encrypted data of said first type;
   store said encrypted data of said first type in a first portion of a non-volatile memory;
   receive state data used for reestablishing a communication link between said computing device and said peripheral device, said state data including connection details of a previously established communication link between said computing device and said peripheral device;
   determine that said state data used for reestablishing said communication link is to be stored subject to a low level of security; and
   store, responsive to said determining, said state data used for reestablishing said communication link in a second portion of said non-volatile memory as plain text.

10. The computing device of claim 8 wherein a device password may be used to change an operational mode of said computing device and wherein the processor is further operable to execute an authentication process to store an encrypted version of said device password.

11. The computing device of claim 8 wherein said data of said first type comprises authentication template data.

12. The computing device of claim 11 wherein said authentication template data comprises biometric template data.

13. The computing device of claim 12 wherein said biometric template data comprises fingerprint template data.

14. The computing device of claim 8 wherein the processor is further operable to base said determining that said data of said first type is to be stored subject to said first level of security on meta data associated with said data of said first type.

15. The computing device of claim 8 wherein the processor is further operable to base said determining that said state data used for reestablishing said communication link between said computing device and said peripheral device is to be stored subject to a low level of security on meta data associated with said state data used for reestablishing said communication link between said computing device and said peripheral device.

16. The non-transitory computer-readable medium of claim 9 wherein a device password may be used to change an operational mode of said computing device and wherein the instructions, when performed by a processor, cause said processor to execute an authentication process to store an encrypted version of said device password.

17. The non-transitory computer-readable medium of claim 9 wherein said data of said first type comprises authentication template data.

18. The non-transitory computer-readable medium of claim 17 wherein said authentication template data comprises biometric template data.

19. The non-transitory computer-readable medium of claim 18 wherein said biometric template data comprises fingerprint template data.

20. The non-transitory computer-readable medium of claim 9 wherein the instructions, when performed by a processor, cause said processor to base said determining that said data of said first type is to be stored subject to said first level of security on meta data associated with said data of said first type.

21. The non-transitory computer-readable medium of claim 9 wherein the instructions, when performed by a processor, cause said processor to base said determining that said state data used for reestablishing said communication link between said computing device and said peripheral device is to be stored subject to a low level of security on meta data associated with said state data used for reestablishing said communication link between said computing device and said peripheral device.

* * * * *